United States Patent [19]

Ishida et al.

[11] Patent Number: 5,142,671
[45] Date of Patent: Aug. 25, 1992

[54] PLURAL CACHE ARCHITECTURE FOR REAL TIME MULTITASKING

[75] Inventors: Itsuko Ishida; Masayuki Hata; Akira Yamada, all of Itami, Japan

[73] Assignee: Mitsubishi Denki Kabushiki Kaisha, Japan

[21] Appl. No.: 434,046

[22] Filed: Nov. 9, 1989

[30] Foreign Application Priority Data

Dec. 19, 1988 [JP] Japan ............... 63-321569

[51] Int. Cl.⁵ ............ G11C 7/00; G06F 13/00; G06F 12/00
[52] U.S. Cl. .............................. 395/425; 365/49
[58] Field of Search ... 364/200 MS File, 900 MS File; 365/49

[56] References Cited

U.S. PATENT DOCUMENTS

| | | | |
|---|---|---|---|
| 4,195,341 | 3/1980 | Joyce et al. | 364/200 |
| 4,245,307 | 1/1981 | Kapeghian et al. | 364/200 |
| 4,264,953 | 4/1981 | Douglas et al. | 364/200 |
| 4,317,168 | 2/1982 | Messin et al. | 364/200 |
| 4,371,928 | 2/1983 | Barlow et al. | 364/200 |
| 4,378,591 | 12/1980 | Lemay | 364/200 |
| 4,494,190 | 1/1985 | Peters | 364/200 |
| 4,831,520 | 5/1989 | Rubinfeld et al. | 364/200 |
| 4,897,783 | 1/1990 | Nay | 364/200 |

Primary Examiner—Alyssa H. Bowler
Attorney, Agent, or Firm—Townsend & Townsend

[57] ABSTRACT

In a data processor, when there is any cache memory not being activated after the whole data processor has been activated, a signal is delivered to a bus driver and then a data processing unit is connected to a system bus. During the period from when the whole data processor has been activated to when all the cache memories start to be activated, the data processing unit is connected to the system bus so that data can be transmitted/received between the data processing unit and peripheral devices.

7 Claims, 4 Drawing Sheets

PLURAL CACHE ARCHITECTURE FOR REAL TIME MULTITASKING

BACKGROUND OF THE INVENTION

1. Field of the Invention

The present invention relates to a data processor with cache memories, and more particularly, to a data processor which is advantageous to a real-time multi-tasking system with plural cache memories.

2. Description of Related Art

FIG. 1 is a block diagram showing a configuration of the main portion of a conventional data processor with a cache memory by way of example, whose configuration is essentially the same as that in such as Japanese Patent Application No. 63-11222 (1988).

In the figure a reference numeral 1 designates a data processing unit which accesses data to a cache memory 2 or a main memory 3 which will be described later.

Both the cache memory 2 and the data processing unit 1 are connected through a data bus DB to a system bus SB, and a bus driver 4 is provided between the system bus SB and both the data processing unit 1 and cache memory 2.

The bus driver 4 is enabled or disabled by controlling of a gate circuit 41 with an output signal of an AND gate 42, so that driving of the data bus DB is controlled. Accordingly, the data processing unit 1 and cache memory 2 are disconnected or connected to the system bus SB.

The AND gate 42 of the bus driver 4 receives two inputs, one of which is a first signal S1 output from the cache memory 2 and the other of which is a second signal S2 output from the data processing unit 1, respectively.

The system bus SB is connected to the data bus DB, the main memory 3, and other peripheral devices, respectively.

The main memory 3 stores various kinds of data to be accessed by the data processing unit 1.

The cache memory 2 as employs 4-way set-associative and data-writing-through, so that the data processor can maintain cache data to be identical with that of the main memory 3 at all times.

Functional operation of such a conventional data processor with a cache memory as referred to above will be described below.

When the data processing unit 1 executes read-access of the required data, the cache memory 2 judges whether the data to be accessed is stored therein or not. Where the data to be accessed is stored in the cache memory 2, which is called "cache-hit", the data to be accessed is delivered from the cache memory 2 through the data bus DB to the data processing unit 1. On the other hand, where the data to be accessed is not stored in the cache memory 2, which is called "cache-miss", 4-word data (corresponding to the number of lines of the cache memory 2) including the data to be accessed is delivered from the main memory 3 through the system bus SB and the data bus DB to the cache memory 2 and the data processing unit 1, respectively, following which the cache memory 2 acquiring and holds the 4-word data delivered from the main memory 3, while the data processing unit 1 fetches the data to be accessed, respectively.

The 4-way set-associative cache memory 2 is adapted to be capable of setting the accessing type of the data held therein by the two way unit, where the "accessing type" designates that the data being accessed in its bus cycle is one out of an instruction, an operand data, a command to the data processor and the like. In the cycle which the data processing unit 1 executes a read access or write-access of the required data, information on the accessing type of data corresponding to its address is output from the data processing unit 1. In the case of a cache-miss when the data processing unit 1 executes read access of the data, the cache memory 2 stores data in accordance with the information of the accessing type of the corresponding data outputted from the data processing unit 1. In addition, where the data processing unit 1 executes read access or write access of the required data, the cache memory 2 refers to the information on the accessing type of corresponding data outputted from the data processing unit 1.

When executing read or write access of the data, the data processing unit 1 first accesses to the cache memory 2. At that time, a signal output from the data processing unit 1 is directly given to the main memory 3 and, when the cache memory 2 is in the cache-hit condition, the data output from the cache memory 2 to the data processing unit 1 collides with the data output from the main memory 3 to the data processing unit 1 on the data bus DB. To avoid this collision, the bus driver 4 is provided between the data bus DB and the system bus SB so that the output signal for accessing data from data processing unit 1 or the input signal from the system bus SB to the data processing unit 1 can be disconnected.

Where the data processing unit 1 meets the cache-miss condition, there is a need to transfer the data stored in the main memory 3 to the data processing unit 1. Accordingly, the cache memory 2 allows the signal showing that it has been in the cache-miss condition, that is, the first signal S1, to become active and sends it to the AND gate 42 of the bus driver 4 as a first input thereof. As a result, the gate circuit 41 of the bus driver 4 is opened so as to drive the data bus DB, which makes it possible to transmit/receive data between the data processing unit 1 and the main memory 3.

Further, where the data processing unit 1 accesses to an area such as I/O area whose data must not be cache, that is, whose data must not be held in the cache memory 2, the processing unit 1 outputs a non-cachable signal, that is, a second signal S2. Since this second signal S2 is given as the second input of the AND gate 42 of bus driver 4, the bus driver 4 drives the data bus DB so that data can be transmitted/received between the data processing unit 1 and the main memory 3.

As may be seen from the above description, excepting the case where the cache memory 2 is in the cache-hit condition, it is necessary that the first signal S1 or the second signal S2 should be sent to the bus driver 4 so as to enable the gate circuit 41 and drive the data bus DB.

In order to activate the cache memory 2, there is a need to set a predetermined value in an internal register of the cache memory 2. By setting a CE bit (Cache Enable Bit) of the internal register (not shown) in the cache memory 2 to be "1", the cache memory 2 is activated so that it can execute caching.

Where the environment of peripheral devices is established by the time that the cache memory 2 starts to be activated after such a data processor as shown in FIG. 1 has been activated, neither the first signal S1 nor the second signal S2 are active, the data bus DB cannot, is not liable to be driven by the bus driver 4. In other words, because such a condition as that data can not be transmitted/received between the data processing unit 1 and the main memory 3 and peripheral devices 5 is maintained until the cache memory 2 starts to be activated, the environment of peripheral devices 5 is not be established.

The conventional data processor is thus problematic in that a peripheral device connected to the system bus cannot be initialized without the data processor issuing a separate signal. Otherwise, the driver is not connected to the system bus until after the cache memory is activated.

FIG. 2 is a block diagram of such a data processor using a multi-cache system with both a first cache memory 21 and a second cache memory 22.

In this data processor, both a first signal S11 of the first cache memory 21 and a first signal S12 of the second cache memory 22 are inputs of an OR gate 43, whose output signal is to the first input of the AND gate 42 of the bus driver 4.

Further in this data processor shown in FIG. 2, during the period that the second cache memory 22 has not been and activated the first cache memory 21 has already been activated, only both cases where the first signal S11 has been output in the cache-miss condition of the first cache memory 21 and where the data processing unit 1 has accessed the non-cachable area and the second signal S2 has been output will the bus drive 4 drives the data bus DB.

Assuming that the first cache memory 21 and the second cache memory 22 support different accessing types of data, respectively, during such period that the first cache memory 21 is still not activated as described above, where the environment of the peripheral devices 5 is established when the whole data processor is activated, and when the data processing unit 1 accesses the data of accessing type supported by the second cache memory 22, neither the first cache memory 21 nor the second cache memory 22 outputs the first signal S1, that is, the first signals S11 and S12, nor does the data processing unit 1 the second signal S2. Consequently, the bus driver 4 is unable to drive the data bus DB so that data can be transmitted/received between the peripheral devices 5 and the data processing unit 1, which makes it impossible to establish the environment of the peripheral devices 5.

As may be seen from the above description, in the conventional data processor with plural cache memories, data can not be transmitted/received between the data processing unit 1 and the peripheral devices 5 until the time that the cache memory starts to be activated after the whole data processor has been activated, which results in a disadvantage that the environment of the peripheral devices can not be established.

SUMMARY OF THE INVENTION

The foregoing disadvantage is overcome in accordance with the present invention. The primary object of the invention is to provide a data processor capable of transmitting/receiving data between a data processing unit and a peripheral devices until a cache memory starts to be activated after the whole data processor has been activated.

Where the cache memory is still not activated after the whole data processor has been activated, the data processor of the present invention delivers a signal specifying this fact to the bus driver so that the data processing unit is connected to the system bus. As a result, where the cache memory is still not being activated after the whole data processor has been activated, the data processing unit is connected to the system bus so that data can be transmitted/received between the data processing unit and the peripheral devices.

The above and further objects and features of the invention will more fully be apparent from the following detailed description with accompanying drawings.

DESCRIPTION OF THE PREFERRED EMBODIMENTS

Embodiments of the present invention will now be referred to the drawings in detail.

Figure 1:
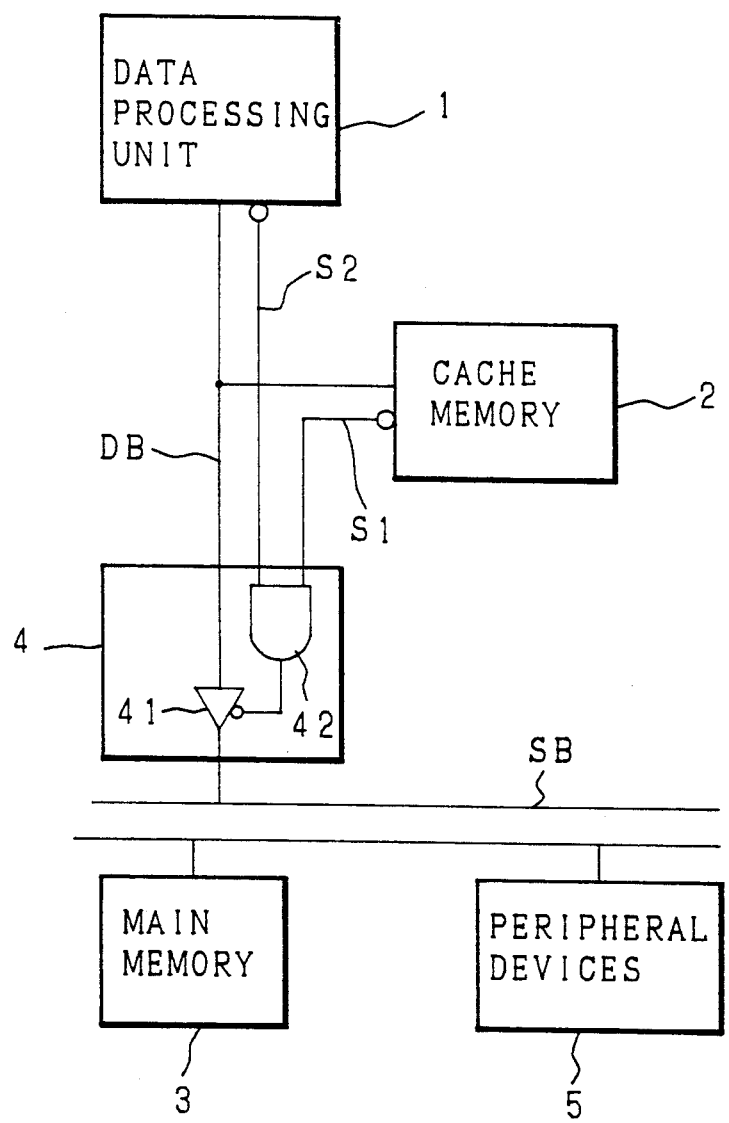
FIG. 1 is a block diagram showing the main portion of the conventional data processor with a cache memory.
Figure 2:
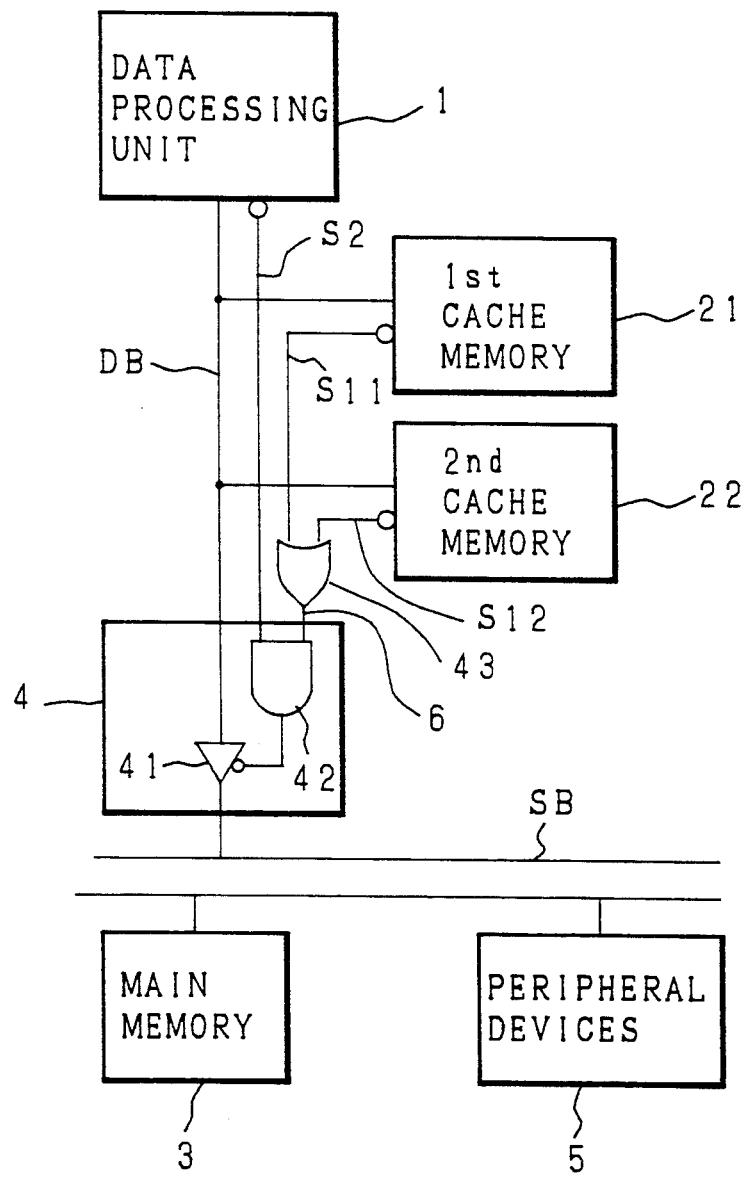
FIG. 2 is a block diagram showing the main portion of the conventional data processor with plural cache memories.
Figure 3:
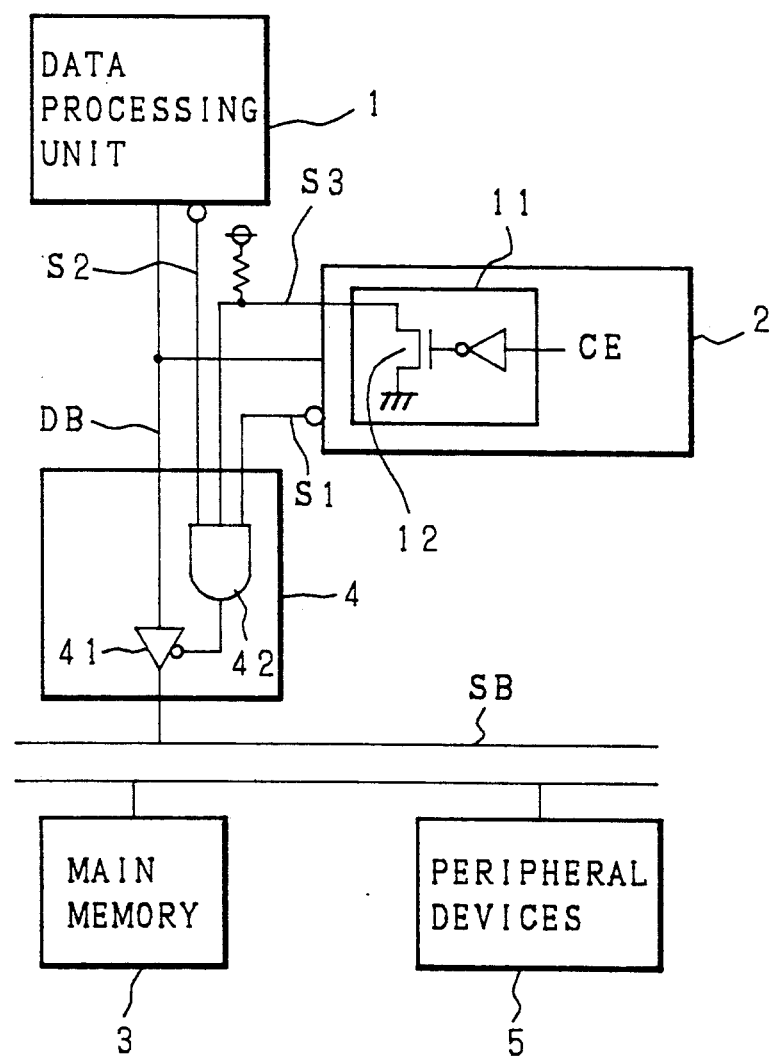
FIG. 3 is a block diagram showing the main portion of the data processor of the present invention.

FIG. 3 is a block diagram showing the main portion of the data processor in accordance with the present invention. In the embodiment of the invention illustrated in FIG. 3, those elements numbered identically with the embodiments of FIGS. 1 and 2 perform the same or similar functions.

In the figure, a reference numeral 1 designates a data processing unit which accesses data with respect to a cache memory 2 or a main memory 3 as will be described later.

The cache memory 2 and the data processing unit 1 are connected through a data bus DB to a system bus SB, and a bus driver 4 is provided between the system bus SB and both the cache memory 2 and the data processing unit 1.

The bus driver 4 is enabled or disabled by controlling of a gate circuit 41 with an output signal of an AND gate 42, so that driving of the data bus DB is controlled. Consequently, the data processing unit 1 and cache memory 2 are disconnected or connected to the system bus SB.

Being different from the one in the conventional embodiment, the AND gate 42 of the bus driver 4 in the data processor of the present invention receives three inputs, the first of which is the first signal S1 output from the cache memory 2, the second of which is the second signal S2 output from the data processing unit 1, and the third of which is the third signal S3 output from the cache memory 2, respectively.

Further the cache memory 2 in the data processor of the present invention is provided with a third signal generating circuit 11. Where a CE bit of the internal register of the cache memory 2 is "0", that is, the cache memory 2 is not being activated, by providing the value "0" of the CE bit to a gate terminal of a switching transistor 12 of the third signal generating circuit 11, the third signal generating circuit 11 is adapted to allow the third signal S3 to be active (of low level).

The system bus SB is connected to the data bus DB, the main memory 3 and the other peripheral devices 5, respectively.

The main memory 3 stores various kinds of data to be accessed by the data processing unit 1.

In such a data processor of the invention as described above, because the third signal S3 output from the cache memory 2 is maintained to be active until the cache memory 2 starts to be activated after the whole data processor has been activated, the output of the AND gate 42 of the bus driver 4 is allowed to be active. As a result, the gate circuit 41 is enabled so that the data bus DB is driven, whereby the data processing unit 1 can transmit/receive data through the system bus SB to/from the peripheral devices 5.

Operation of the cache memory 2 after being activated is the same as that in the conventional embodiment as aforementioned.

Figure 4:
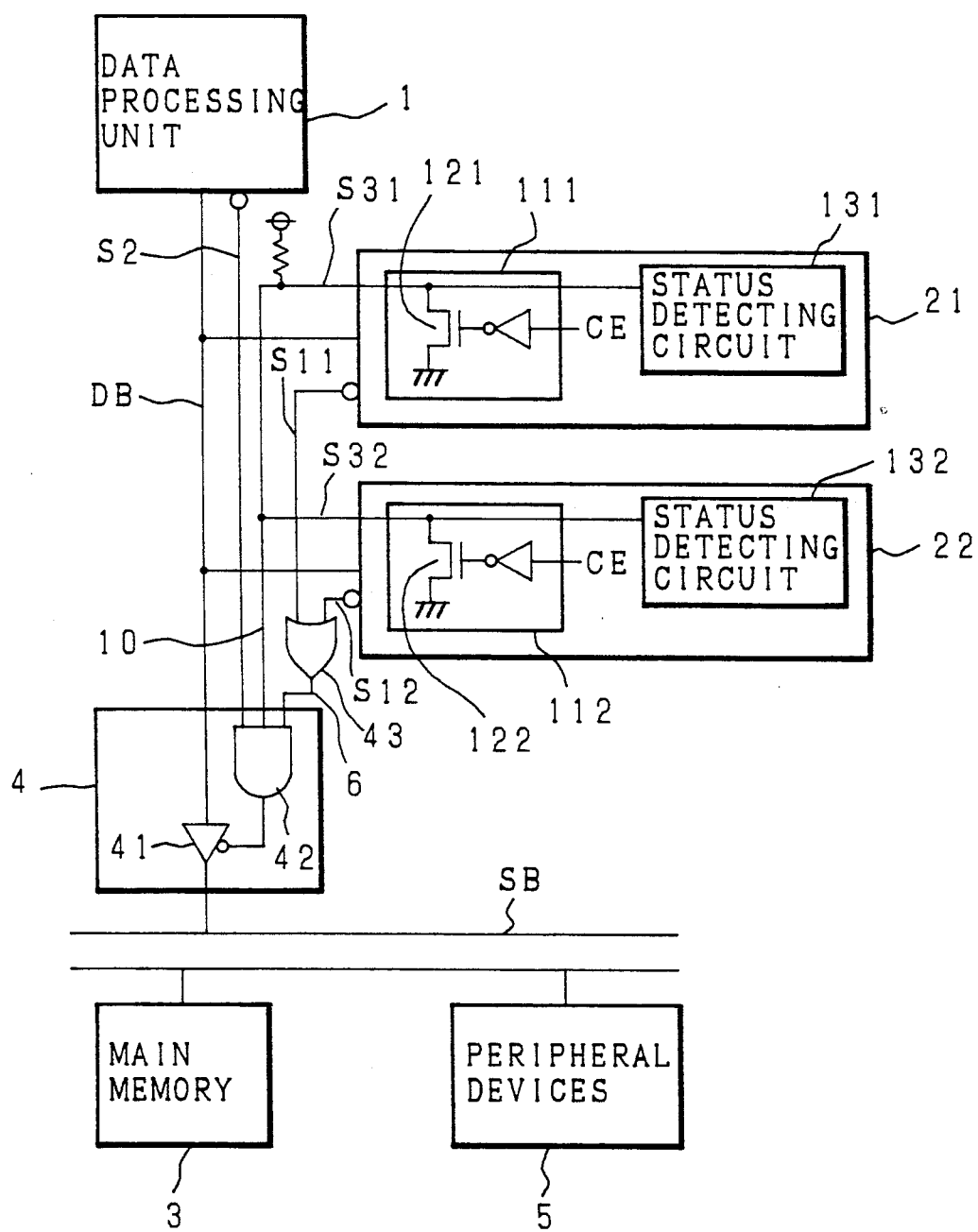
FIG. 4 is a block diagram of the data processor with plural cache memories in another embodiment.

FIG. 4 is a block diagram showing the main portion of the data processor of another embodiment of the present invention. The data processor of this embodiment employs a multiple caching system with both the first cache memory 21 and the second cache memory 22. In this data processor, both a first signal S11 of a first cache memory 21 and a first signal S12 of a second cache memory 22 are inputs of whose output an OR gate 43, which signal is adapted to be delivered to the AND gate 42 of the bus driver 4.

Further both the cache memories 21, 22 are provided with third signal generating circuits 111, 112, respectively. Where the CE bit of the internal register of the cache memory 21 (22) is "0", that is, the cache memory 21 (22) is not being activated, by providing the value "0" of the CE bit to a gate terminal of a switching transistor 121 (122) of the third signal generating circuit 111 (112), the third signal generating circuit 111 (112) is adapted to allow the third signal S31 (S32) to be active (of low level).

Both the third signal S31 of the first cache memory 21 and the third signal S32 of the second cache memory 22 are connected together outside chips of the both cache memories 21, 22 so that they can become the third input of the AND gate 42 of the bus driver 4.

Further the third signal generating circuit 111 (112) is provided with a circuit for detecting the condition of the other cache memory 22 (21), that is, a status detecting circuit 131 (132), respectively. This status detecting circuit 131 (132) detects whether the other cache memory 22 (21) is being activated or not by detecting the level of the third signals S31, S32 outputted from the other cache memory 22 (21). The status detecting circuit is adapted to inhibit the cache memory from being itself activated until it dectects the other cache memory has been activated.

In such a embodiment as shown in FIG. 4, where the first cache memory 21 is being activated (where CE bit is "1"), a switching transistor 121 in the third signal generating circuit 111 therein is turned off, which allows the third signal S31 to be of high level (non-active). On the other hand, where the second cache memory 22 is not being activated (where CE bit is "0"), a switching transistor 122 in the third signal generating circuit 112 therein is turned on, which allows the third signal S32 to be of low level (active).

When the status detecting circuit 131 in the first cache memory 21 detects that the third signal S32 of the second cache memory 22 is of low level, the first cache memory 21 cannot be activated although the CE bit of itself is "1".

After the CE bit of the second cache memory 22 is changed to "1" so as to be activated, the third signal S32 goes high. The status detecting circuit 131 of the first cache memory 21 detects that the third signal S32 of the second cache memory 22 is high and activates the first cache memory 21. Consequently, since both the third signals S31, S32 of the both cache memories 21, 22 have become high, the third signal S3 transmitted to the third input of the bus driver 4 becomes high (non-active).

As may be seen as referred to above, during the period the whole data processor has been activated until the third signal S3 of a high level is delivered to the third input of the AND gate 42 of the bus driver 4, the gate circuit 41 of the bus driver 4 is enabled that any data can freely be transmitted/received between the data processing unit 1 and the system bus SB. In other words, such condition is kept so that the data processing unit 1 can establish the environment of the peripheral devices 5.

Such functional operation as described above is performed similarly in the case where the first cache memory 21 is activated after the second cache memory 22 has been activated. Further where the data processor is provided with more than two cache memories, such condition is maintained as that the data processing unit 1 can establish the environment of the peripheral devices 5 until all the cache memories are activated in the same way as described above.

As referred to above in detail, in the data processor of the present invention, the environment of the peripheral devices can readily be established because data can be transmitted/received between the data processing unit and the peripheral devices during the time since the whole data processor has been activated until the cache memory is activated.

Further, regardless of the number of cache memories, the data processor of the present invention has the advantage as described above, and, its configuration can advantageously be used in a data processor with a real-time multi-tasking system with plural cache memories.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A data processing unit comprising:
    a data processing unit;
    a main memory for storing a plurality of data and coupled to a system bus;
    a cache memory for storing a subset of the plurality of data stored in said main memory, and activated when a register therein is initialized;
    a detecting means, coupled to said register, for detecting when said cache memory is activated and for asserting a first signal when said cache memory has yet to be activated and deasserting said first signal once said cache memory is activated; and
    a bus driver, coupled to said detecting means and to said data processing unit, for connecting said data processing unit to a system bus, wherein said bus driver is enabled when said first signal is asserted.

2. The data processor as set forth in claim 1 comprising one said cache memory.

3. The data processor as set forth in claim 1 wherein said cache memory is plural in number, and said detecting means asserts said signal to enable said bus driver when said detecting means detects that at least one of said plural cache memories has not yet been activated.

4. The data processor of claim 3 wherein said detecting means deasserts said first signal when said detecting means detects that each one of said plural cache memories has been activated.

5. The data processor of claim 1 wherein said detecting means deasserts said first signal when said detecting means detects that said cache has been activated.

6. The data processing system of claim 1 further comprising:
a means for asserting a second signal when said cache memory is activated and when data to be accessed by said data processor is not contained in said subset of data stored in said cache memory; and
wherein said bus driver is coupled to said means for asserting a second signal and wherein said bus driver is enabled when said second signal is asserted.

7. The data processing system of claim 1 further comprising:
a means for asserting a noncacheable signal; and
wherein said bus driver is coupled to said means for asserting a second signal and wherein said bus driver is enabled when said noncacheable signal is asserted.

* * * * *